Dec. 13, 1966 E. J. SCHNEBERGER 3,292,158
DATA PROCESSING APPARATUS INCLUDING MEANS FOR PROCESSING
WORD AND CHARACTER FORMATTED DATA
Filed July 30, 1963 6 Sheets-Sheet 1

INVENTOR.
EDWARD J. SCHNEBERGER
BY Arthur Freilich
ATTORNEY

*Fig. 2(c)*

| | STATE | L | E | M | D | P | A | GATING SIGNALS |
|---|---|---|---|---|---|---|---|---|
| CYCLE 1 | RL | | e[n] | m | d | p | | ← RL |
| | WL | | | | | | | ← WL |
| | RI | e[n] | (d) | d | m+1 | | | ← RI |
| | WI | | | | | | (d)* | ← WI |
| | RP | | (p) | p | | d+1 | | ← RP |
| | WP | | (d)* | | | | | ← WP |
| CYCLE 2 | RI | e[n-1] | (d+1) | d+1 | | p+1 | | ← RI |
| | WI | | | | | | (d+1)* | ← WI |
| | RP | | (p+1) | p+1 | | d+2 | | ← RP |
| | WP | | (d+1)* | | | | | ← WP |
| CYCLE 3 | RI | e[n-2] | (d+2) | d+2 | | p+2 | | ← RI |
| | WI | | | | | | (d+2)* | ← WI |
| | RP | | (p+2) | p+2 | | d+3 | | ← RP |
| | WP | | (d+2)* | | | | | ← WP |
| CYCLE 4 | RI | e[n-3] | (d+3) | d+3 | | p+3 | | ← RI |
| | WI | | | | | | (d+3)* | ← WI |
| | RP | | (p+3) | p+3 | | d+4 | | ← RP |
| | WP | | (d+3)* | | | | | ← WP |
| ⋮ | | | | | | | | |
| CYCLE n | RI | e[o] | (d+n) | d+n | | p+n | | ← RI |
| | WI | | | | | | (d+n)* | ← WI |
| | RP | | (p+n) | p+n | | d+n+1 | | ← RP |
| | WP | | (d+n)* | | | | | ← WP |
| | RL | | | m+1 | | | | |

EDWARD J. SCHNEBERGER
INVENTOR.

BY Arthur Freilich

ATTORNEY

EDWARD J. SCHNEBERGER
INVENTOR.
BY Arthur Frielich
ATTORNEY

Dec. 13, 1966 E. J. SCHNEBERGER 3,292,158

DATA PROCESSING APPARATUS INCLUDING MEANS FOR PROCESSING WORD AND CHARACTER FORMATTED DATA

Filed July 30, 1963 6 Sheets-Sheet 4

EDWARD J. SCHNEBERGER
INVENTOR.

BY Arthur Freilich

ATTORNEY

Dec. 13, 1966 E. J. SCHNEBERGER 3,292,158

DATA PROCESSING APPARATUS INCLUDING MEANS FOR PROCESSING WORD AND CHARACTER FORMATTED DATA

Filed July 30, 1963 6 Sheets-Sheet 5

EDWARD J. SCHNEBERGER
INVENTOR.

BY Arthur Freilich

ATTORNEY

Dec. 13, 1966 E. J. SCHNEBERGER 3,292,158

DATA PROCESSING APPARATUS INCLUDING MEANS FOR PROCESSING WORD AND CHARACTER FORMATTED DATA

Filed July 30, 1963 6 Sheets-Sheet 6

EDWARD J. SCHNEBERGER
INVENTOR.

BY Arthur Fraelich

ATTORNEY

United States Patent Office 3,292,158
Patented Dec. 13, 1966

3,292,158

DATA PROCESSING APPARATUS INCLUDING MEANS FOR PROCESSING WORD AND CHARACTER FORMATTED DATA

Edward J. Schneberger, Los Angeles, Calif., assignor, by mesne assignments, to Bunker-Ramo Corporation, Stamford, Conn., a corporation of Delaware Filed July 30, 1963, Ser. No. 298,672
13 Claims. (Cl. 340—172.5)

Figure 1A:
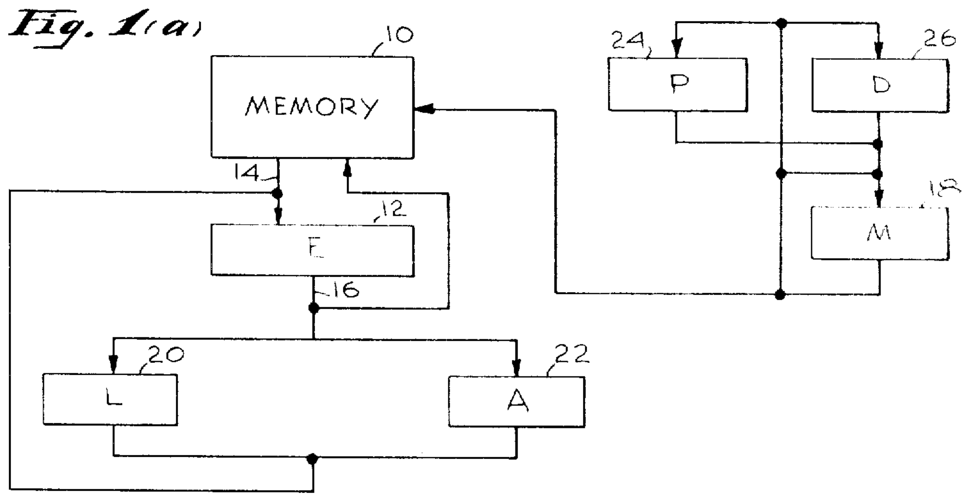

This invention relates generally to improvements in digital data processing apparatus.

From a user's standpoint, digital data processing apparatus, and more particularly general purpose digital computers, can be considered as comprised of two broad categories, i.e. digital computers better adapted to handle scientific type computing problems and digital computers better adapted to handle business type computing problems.

The differences between scientific type computing and business type computing are well recognized and will be only briefly discussed here. Essentially, scientific type computing is characterized by rather lengthy and complex calculations on the same set, or a relatively small number of sets, of data. The data is generally arranged in computer words with each word consisting of a plurality of digits and generally being representative of a single number of quantity. Operations are generally performed on full words rather than on individual digits or groups of digits less than a full word. More particularly, although the digits of a word can be handled either serially or in parallel, each digit of a word is subjected to the same operation. Such computers can be considered as having a word oriented data structure.

Most general purpose prior art digital computers designed to principally process scientific type problems have a fixed word length and utilize a binary code consisting of binary digits (bits) to represent numbers. A significant characteristic of any digital computer is its word length meaning the number of bits in a word or the number of bits which are normally operated upon in the same manner during each operation. In scientific type computers, where one computer word is generally utilized to represent one number or quantity, the length of the word of course determines the precision with which the number or quantity can be expressed.

Contrasted with scientific type digital computers which invariably are of the word oriented type, digital computers designed to perform business data processing and computing tasks can have data structures which are either word or character oriented. That is, whereas in digital computers designed to perform scientific type problems each number or quantity is generally represented by a full word, perhaps in true binary form, digital computers designed to perform business type problems represent numbers and other information, such as names, as a series of alphanumeric characters. Where these characters are operated upon in a serial fashion, the computer is said to be character oriented, and where the characters are packed in words which are operated upon in parallel, the computer is said to be word oriented. A common set of alphanumeric characters which can consist of 64 discrete characters including the letters of the alphabet, all decimal numerals, punctuation characters, etc., can be represented by a six bit code.

Business type computing problems are generally distinguishable from scientific type computing problems in that they are characterized by the performance of shorter and simpler operations upon a much greater number of sets of data. For example, a typical business type problem may include repetitively calculating the net earnings of 10,000 different employees, knowing the gross earnings and deductions of each. The operations or calculations involved are simple, i.e., the deductions of each employee are totalled and then the resulting sum is subtracted from the employee's gross earnings. Although the actual calculations are exceedingly simple, the value of the digital computer for business type problems, of course, lies in its ability to repetitively make very many such calculations very rapidly.

In representing business type data, as, for example, a list of employees together with information regarding each, many different categories of information have to be represented. For example, in addition to representing the name of each employee, other necessary categories might possibly include: social security number, age, hourly rate, straight hours worked, overtime hours worked, company job number to which hours were charged, number of exemptions for tax purposes, various other deductions, cumulative amounts, etc.

Normally, employee or payroll records of this type are retained on magnetic tape and are updated by information provided on, for example, punched cards. In order to update the category entries on the magnetic tape, all the information on the magnetic tape and the cards must at some time be entered into the memory of the computer, normally of the magnetic core type, for processing by the computer.

In the handling of data of this type, it is often necessary to be able to unpack packed data or conversely pack unpacked data. Packed data comprises data in which several items or characters are included in a single computer word. To unpack a packed word means to separate the packed items or characters so as to put each in a different word. It is often necessary to be able to pack and unpack data because data is usually packed on magnetic tape, for example, and must be unpacked for computer processing. Each in situations where data need not be unpacked, it often has to be shifted from nonaligned into aligned fields. For example, one situation in which nonaligned fields arise is where variable length formatting is used.

More specifically, each of the category entries (or fields) which is associated with each employee may or may not be of the same length as corresponding entries for other employees. For example, the length of employees' names can vary from two characters (letters) to perhaps 15 characters. Because of this variation in length, it is uneconomical to dedicate a full word or integral number of full words having a length sufficient to represent the longest possible entry for each employee. Rather, most efficient utilization can be made of the memory capacity and processing capabilities of the computer by dedicating to each entry only the memory and processing capacity required to store and process that particular entry. Thus, instead of utilizing fixed length fields, it has been recognized in the business data processing art that increased efficiency can be obtained by the utilization of variable length fields. That is, data is represented by a plurality of characters which are stored and processed serially in each field. Such a data structure, i.e., a structure in which characters are processed individually, as heretofore indicated is referred to as a character oriented data structure. This type of data structure is distinguishable from a word oriented data structure in which each word represents a number or a series of characters, and operations are performed on words.

In a character oriented structure, information in the characters themselves can be utilized to represent the end of a field, and consequently no spaces need be left in the memory and no processing elements need operate on meaningless data as would be the case where a word oriented data structure were utilized and only a fraction of the word were representative of actual data.

Although computers having character oriented data structures provide maximum efficiency from the standpoint of the amount of hardware required, their speed is limited because all characters are handled in a serial manner. Consequently, although it is clearly desirable to have a variable length field capability for business computing applications, it is often advantageous to be able to operate on a plurality of characters in parallel, i.e., in a word oriented manner. For example, in order to add two 3-character numbers together, six memory accesses would be required in a character oriented machine, while only two memory accesses would be required in a word oriented machine.

Although general purpose digital computers, as the nomenclature implies, are designed to be highly adaptable so as to handle a wide range of processing tasks, most such prior art computers employ data structures which are either word oriented or character oriented. That is, where a word oriented structure is used, it is usually a fairly difficult task to process character formatted data which requires that fractions of words be isolated for separate processing. The difficulty resides in the programming required to accomplish such tasks and the relative inefficiency of mask or extract and merge operations which are utilized. On the other hand, in character oriented machines, more processing time is expended because each character must necessarily be handled serially and advantage cannot be taken of certain situations in which characters could be processed in parallel.

In view of this, it is an object of this invention to provide data processing apparatus particularly suited for selectively processing information in either a word or character oriented manner.

The approach introduced herein to achieve improved data processing is to utilize character formatted words so as to permit the performance of parallel operations thereon wherever possible. Inasmuch as parallel operations can be performed only if the characters to be operated upon are properly packed in a word, means for packing, unpacking, and moving individual characters must be provided which is simple and inexpensive enough to justify its use for the processing improvements to be gained as a result of the increased parallel processing. The capability of performing parallel operations on characters for operations such as search, compare, and certain arithmetic operations saves considerable time inasmuch as the number of memory accesses required can be considerably reduced.

It is therefore an object of this invention to provide data processing apparatus including means particularly adapted to transfer and handle selected individual characters comprising portions of computer words.

Briefly, the invention herein is based upon the recognition that improved data processing can be realized by employing a character formatted word and incorporating means in data processing apparatus for addressing and manipulating not only selected word locations in a memory but in addition selected character locations in each word location.

In a preferred embodiment of the invention, a data processing apparatus is provided having a memory including a plurality of binary storage elements arranged to define a plurality of word locations. The storage elements of each word location are capable of storing a word and are divided into groups, each group being capable of storing a character. The exemplary embodiment of the invention illustrated herein makes use of an 18-bit data word comprised of three 6-bit characters.

Associated with the memory is a memory address register including two portions respectively adapted to store address information including a memory word location and a character location therein. Additionally, an exchange register is provided for receiving information read from the memory or entering information written into the memory. Further, a storage register is provided for exchanging information with the exchange register.

Decoding means are provided between the word location address portion of the memory address register and the memory for identifying a memory word location so as to cause a word stored in said location to be written into the exchange register or cause a word to be read from the exchange register into said location. The character location address portion of the memory address register identifies a particular one of the three characters contained in the word transferred between said location and the exchange register.

The character location address portion of the memory address register comprises a cycle counter, preferably a ring counter having as many stages as the number of characters in a word (herein, three). In order to process data in a character oriented manner, one stage of the ring counter is loaded with a unique bit, that is, a bit distinguishable from all other bits in the counter. In response to each memory access, such accesses being synchronized by output pulses generated by a timing pulse source, the unique bit is shifted one stage. An adder circuit interconnects the ring counter with the word location address portion and increments the word location address information each time the circulating unique bit in the ring counter is shifted into a predetermined one of its stages. The position of the unique bit after each memory access controls the character transfer between the exchange and storage registers. Consequently, each of the three character locations of any memory word location can be successively selected without at the same time selecting other character locations in the same word location and in addition each character in a block of words can be successively selected.

In order to process information in a word oriented, rather than a character oriented, manner, it is merely necessary to change the state of all the nonunique bits in the ring counter to the state of the unique bit, and as a consequence a single character location will no longer be selected at a time, but instead all character locations in an identified word location will be selected. Moreover, the adder circuit interconnecting the character and word location address portions will increment the word location address information after each memory access.

Figure 1B:
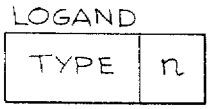
Figure 1D:
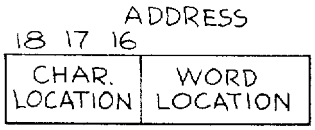
Figure 1C:
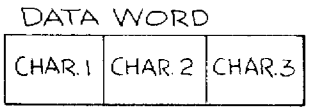
Figure 2A:
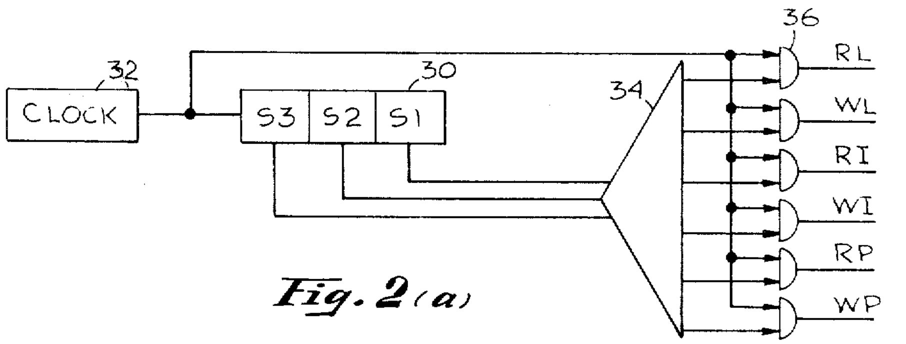
Figure 2B:
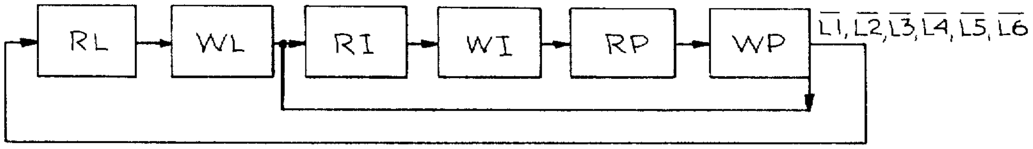
Figure 3A:
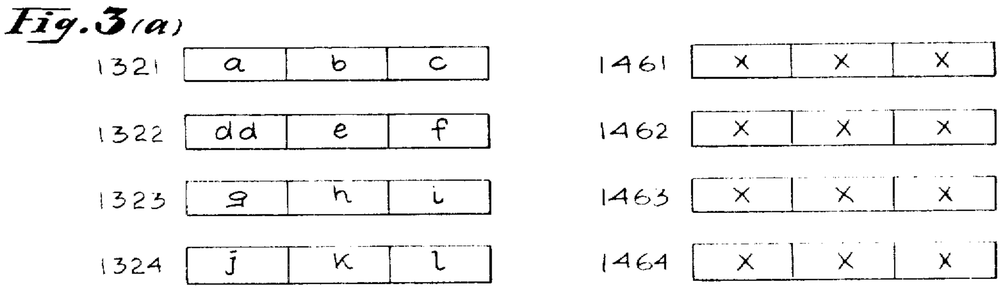

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1*a* is a block diagram of a typical digital data processing apparatus adapted to operate in accordance with the teachings of the invention;

FIG. 1*b* illustrates the general format of a logical command (logand) utilized to control the operation of the apparatus of FIG. 1*a*;

FIG. 1*c* illustrates the format of a data word showing the three characters contained therein;

FIG. 1*d* illustrates the format of an address showing the word and character location address portions;

FIG. 2*a* is a block diagram of state counter apparatus adapted to define a plurality of processing states;

FIG. 2*b* is a flow diagram illustrating the sequence of processing states defined by the state counter apparatus of FIG. 2*a* during the processing of data in accordance with the invention;

FIG. 2*c* comprises a table illustrating the contents of the various registers of FIG. 1*a* during states specified by the state counter apparatus of FIG. 2*a* during the processing of data in accordance with the invention;

FIG. 3*a* comprises a representation of several arbitrarily chosen memory word locations and the character contents of certain ones of those locations;

FIGS. 3*b*, 3*c*, 3*d*, and 3*e* comprise representations of the memory word locations of FIG. 3*a* and illustrate the contents of those locations in the performance of the word move, character move, unpack, and pack logands respectively;

FIG. 4*a* is a schematic diagram of the memory address register (M) utilized to identify word and character locations in the memory of FIG. 1*a*;

FIG. 4*b* is a schematic diagram of the logand register (L); and

Figure 5:
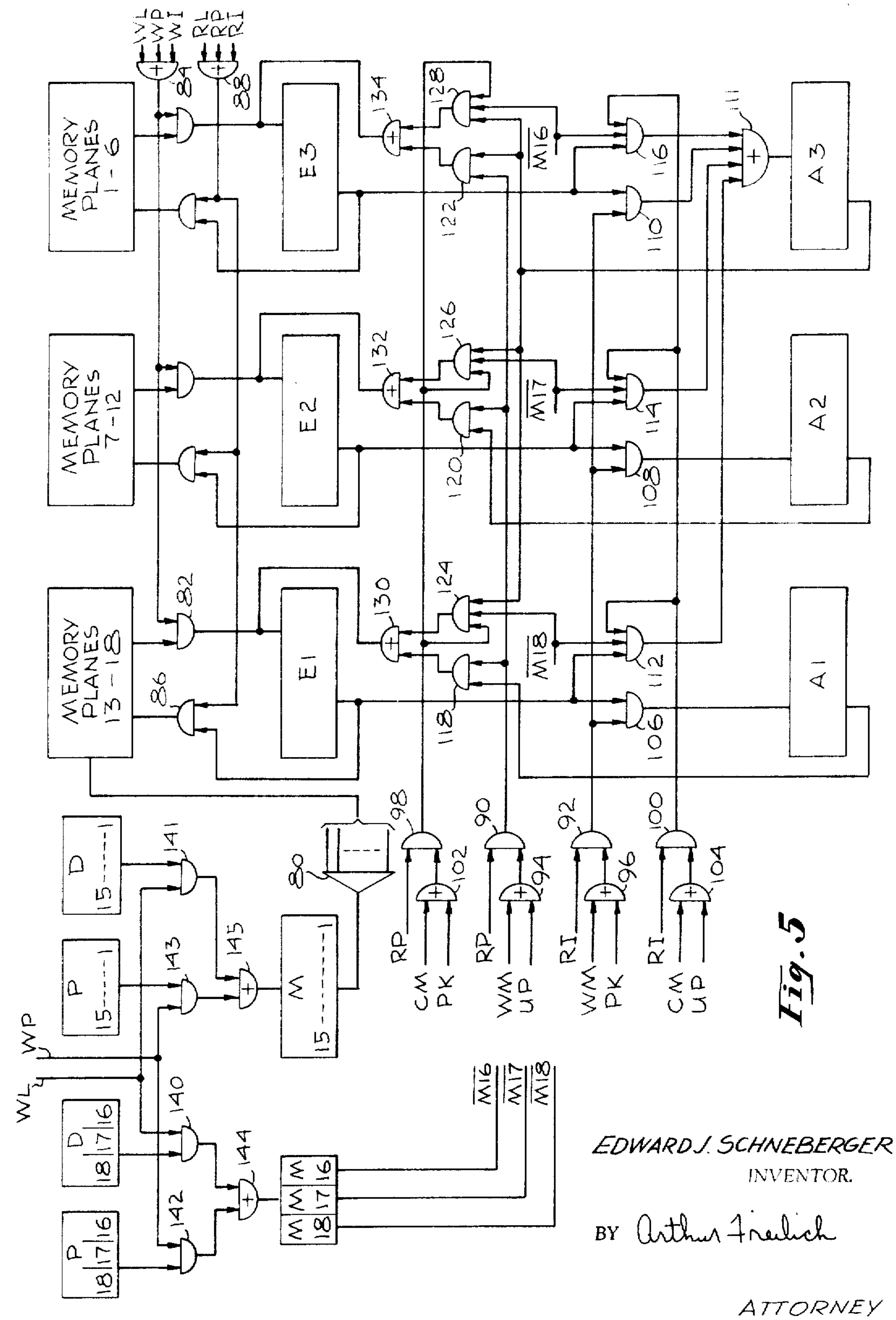

FIG. 5 is a schematic diagram illustrating in greater detail the elements of FIG. 1*a* and the interconnections therebetween.

Attention is now called to FIG. 1*a* which comprises a block diagram illustrating a data processing apparatus adapted to operate in accordance with the teaching of the invention. The apparatus of FIG. 1*a* includes a memory 10 which, for purposes of clarity in explanation, will be assumed to be of the conventional magnetic core type. Magnetic core memories are typically of the destructive readout type; i.e., information in memory must be destroyed in order to read that information out of the memory and, consequently, if information is to be preserved, it must be written back into the memory. The assumption of this type of memory requires that a memory read operation always be immediately followed by a memory write operation, and it will be seen below that the state counter of FIG. 2*a* accordingly alternately defines read and write states.

It will further be assumed that the word length to be utilized herein for both logical commands (logands) and data words will be 18 bits. Consequently, the memory 10 will consist of 18 memory planes, with each plane including a number of magnetic cores equal to the word storage capacity of the memory.

An E or exchange register 12 is provided for receiving information read from the memory 10 and for entering information written into the memory 10. The E register 12 is represented by block having a lead line 14 entering the top surface thereof and a lead line 16 emerging from the bottom surface thereof. The lines 14 and 16 respectively represent the input and output channels of the E register 12, and this representation will be maintained throughout the specification and extended to all other registers when represented in block form. Inasmuch as the memory 10 is assumed to be of the destructive readout type, all information entering or leaving the memory 10 is transferred into and out of the E register 12. More particularly, none of the other registers to be mentioned is able to communicate directly with the memory 10 but rather must transfer information between itself and the E register in order to receive information from or enter information into the memory 10.

An M or memory address register 18, to be more fully described in conjunction with the explanation of FIG. 4*a*, is provided for holding address information which identifies word locations in the memory 10 and in addition character locations in such identified word locations. More particularly, the identifying of a word or character location in the memory 10 by the M register 18 causes information to be read from the identified location into the E register 12 or written into the identified location from the E register 12. That is, the M register 18 only exercises control over the memory 10 to effect transfers of information between the memory 10 and the E register 12. The E register 12 and M register 18, like all other registers to be hereafter introduced, will be assumed to be 18 bits in length.

The output of the E register 12 is connected to the inputs of L register 20 and A register 22. The L register 20, as will be seen below, is used generally to hold logands during periods in which data is being processed in accordance with the logands. The format of a logand is illustrated in FIG. 1*b*, it being noted that the 18 bits thereof are separated into two sections. The first section defines the type of logand. Suffice it to say at this point that four different types of logands will be considered herein for effecting the character processing capability in accordance with the invention. These four logands are (1) word move, (2) character move, (3) unpack, and (4) pack. The information in the second section of the logand format shown in FIG. 1*b* is designated by the letter *n* and defines the duration of a particular logand.

The A register 22 is adapted to receive data words having the format shown in FIG. 1*c* from the E register 12. As noted, the data words include 18 bits separated into three characters, character 3 being the rightmost character and stored in register bit positions 1 through 6 and character 1 being the leftmost character and stored in register bit positions 13 through 18. The outputs of both the L register 20 and A register 22 are connected to the input of the E register 12. Both the input and the output of the E register 12 are connected to the memory 10.

The output channel of the M register 18 is connected to the input channels of a P register 24 and a D register 26. The output channels of the P and D registers 24 and 26, and also the output channel of the M register, are connected to the input channel of the M register 18. Whereas the E, L, and A registers are adapted to store information derived from or to be entered into the memory 10, the M, P, and D registers are adapted to store address words to select or identify locations in the memory 10. The format of an address word is shown in FIG. 1*d*, wherein it will be noted that bits 1–15 thereof comprise a word location address portion and bits 16–18 thereof comprise a character location address portion. When bits 16–18 are all binary "0's," the address word identifies a memory word location, and when bits 16–18 contain two binary "1's" and one binary "0," the address word identifies a character location.

The processing of data in accordance with the invention requires the definition of successive states during which certain logical operations occur. In order to define these states, a state counter 30 consisting of stages S1, S2, and S3 is provided. The state counter 30 is sequenced by pulses derived from a clock or timing pulse source 32. The utilization of a state counter having three binary stages enables eight different states to be defined. Only six of these states will be utilized in the performance of the data processing in accordance with the invention. The nomenclature utilized to define these states is respectively RL (read logand), WL (write logand), RI (read intermediate), WI (write intermediate), RP (read operand), and WP (write operand). Each of these states is defined by a different one of the output lines of decoding network 34 being logically true. The output lines of the decoding network 34 are each connected to the input of a different AND gate 36 together with the output terminal of clock 32. Consequently, the AND gates 36 can provide gating signals synchronized with the clock pulses and definitive of each processing state. The gating signals are utilized in the apparatus of FIGS. 4 and 5 and are identified by the nomenclature of the state at the end of which they are generated. That is, when the state counter defines state RL, a subsequent timing pulse generated by the clock 32 will cause the state counter 30 to switch to another state and will generate a gating pulse RL. Similarly, a pulse generated by clock 32 during state WL will cause the state counter to switch to another state and generate a gating signal WL.

FIG. 2*b* illustrates a flow diagram showing the normal sequence of states assumed by the state counter 30. More particularly, a pulse provided by clock 32 when state counter 30 is in state RL will cause the state counter to assume state WL. From state WL, the state counter 30 successively proceeds through states RI, WI, RP, and WP. The generation of a pulse by clock 32 when the state counter 30 is in state WP will cause the state counter 30 to assume state RI unless stages 1 through 6 of the L register, as will be more readily appreciated below, are all in a binary "0" state, and if this condition exists, state counter 30 will then assume state RL. It will be noted that in any event each read operation is always followed by a write operation so as to assure that any information read from the memory 10 is written back into the memory 10 (it will be recalled that memory 10 has been assumed to be of the destructive readout type).

FIG. 2*c* is a table illustrating the contents of each of the previously mentioned registers during each state in the performance of logands of the aforementioned four types.

The first type of logand, i.e., word move, is utilized to successively move words stored in a first block of successive memory word locations, the address of the first word location in the first block being initially stored in the D register, to corresponding positions in a second block of successive memory word locations, the address of the first word location in the second block being initially stored in the P register. The second section of the logand, i.e., *n*, indicates the length of the first block in terms of the number of word locations it includes.

The second logand, i.e., character move, is utilized to successively move characters from a first block of successive character locations to corresponding positions in a second block of successive character locations. In the performance of the character move logand, the information initially stored in the D and P registers respectively represents the first character location in the first block and the first character location in the second block. The second section of the logand represents the length of number of character locations in the first block.

The unpack logand enables successive characters packed in words in a first block of word locations to be separated so that each formerly packed character is placed in a separate word location in a second block. For example, characters 1, 2, and 3 in memory word location *x* are successively transferred to character location 1 in memory word locations *y*, *y*+1, and *y*+2. In the performance of the unpack logand, the D register is initially loaded with the address of the first character location in the first block while the P register is loaded with the address of the first word location in the second block.

The pack logand is essentially the reverse of the unpack logand in that it permits the successive transfer of characters in character position 1 of successive word locations in a first block to successive character positions in a second block of character locations. In the performance of the pack logand, the D register initially contains the address of the first word location in the first block while the P register contains the address of the first character location in the second block.

The table of FIG. 2*c* is generic to the four types of logands and defines the contents of the various registers during each processing state for successive cycles in the performance of the logands.

In the table of FIG. 2*c*, the registers already described are denoted by upper case letters and the initial contents of each register is denoted by a corresponding lower case letter. A lower case letter in parentheses refers to the contents of the location whose address is represented by the lower case letter within the parentheses; e.g. "(*d*)" means the contents of the memory word location whose address is *d*. An asterisk (*) next to a lower case letter enclosed in parentheses indicates that the register contents can comprise a word or only a selected character, depending upon which type of logand is considered. The symbol *e*(*n*) refers to a logand with the (*n*) comprising the second section of the logand specifying its length as previously described. The symbol +1; e.g. in "*d*+1" indicates the incrementation of an address which can be either by one word or one character depending upon the type of logand being considered.

The operation of the apparatus in the performance of the four logands is described by the table in the following manner. In cycle 1 of the performance of a logand, during state RL, the logand *e*(*n*) is accessed from memory location *m* stored in register M. Character or word location addresses *d* and *p* are stored in registers D and P. The addresses *d* and *p* respectively represents the first character location address or first word location address in first and second blocks. The initial contents of the L and A registers are not pertinent to the present discussion. Subsequently, during state WL, the logand *e*(*n*) is rewritten into memory word location *m*. In response to gating signal WL, the logand *e*(*n*) is tranferred to the L register while the address *d* is transferred to the M register thereby causing the contents of memory word location *d* to be brought into the E register. The contents *m* of the M register is incremented by one and loaded into the D register. Subsequently, during state WI, the word from word location *d* is written back into the memory, and either the entire word or a selected character thereof is transferred to the A register. In response to gating signal WI, address *p* is transferred from the P register into the M register and thereby causes the contents of word location *p* to be transferred to the E register. Simultaneously, the address *d* is transferred from the M register, incremented by one and entered into the P register. In response to the gating signal RP, the contents (*d*)* of the A register are transferred into the E register and thence into the word location *p* of the memory.

During the second cycle, the RL and WL states do not occur in accordance with the flow diagram of FIG. 2*b*. In response to the gating signal WP, the second section of the logand is decremented by one so that during state RI, the logand stored in the L register can be represented by *e*(*n*−1). The address *d*+1 in the P register is transferred into the M register thereby causing the contents of the word location *d*+1 to be transferred into the E register. The address *p* in the M register is incremented by one and entered into the P register. In response to the subsequent gating signal RI, as in the previous cycle, either the entire word in the E register or a selected character thereof is transferred into the A register. In response to the subsequent gating signal WI, the address *p*+1 in the P register is brought into the M register thereby causing the contents of the word location *p*+1 to be entered into the E register. Also, the address *d*+1 of the M register is incremented and entered into the P register. In response to gating signal RP, as in the first cycle, the contents of the A register is transferred into the E register thereby causing it to be written in word location *p*+1 of the memory.

The same operations are performed in response to the same gating signals during subsequent cycles. The second section, *n*, of the logand is decremented by one for each cycle. When *n* is equal to zero, as represented by a binary "0" in each of stages 1 through 6 of the L register, as will be more readily understood below, the state counter 30 assume state RL after state WP, as illustrated in FIG. 2*b*. In response to gating signal WP and *n*=0, the address *m*+1 in the D register is transferred into the M register thereby causing a subsequent logand to be entered into the E register.

Attention is now called to FIG. 3 which illustrates in greater detail the differences between the four types of logands and the operations performed in response to each. FIG. 3*a* illustrates two blocks of four successive arbitrarily chosen memory word locations. That is, locations 1321 (octal), 1322, 1323, and 1324 of the first block are illustrated as respectively containing characters *a*, *b*, and *c*, *dd*, (the symbology *dd* will be used to represent the character between characters *c* and *e* in order to distinguish it from the frequently used address *d* initially in the D register) *e*, and *f*, *g*, *h*, and *i*, and *j*, *k*, and *l*. Additionally, a second block of four word locations starting with location 1461 (octal) and including locations 1462, 1463, and 1464 is illustrated. The words in the second block of word locations are illustrated as not storing characters of significance.

Figure 3B:
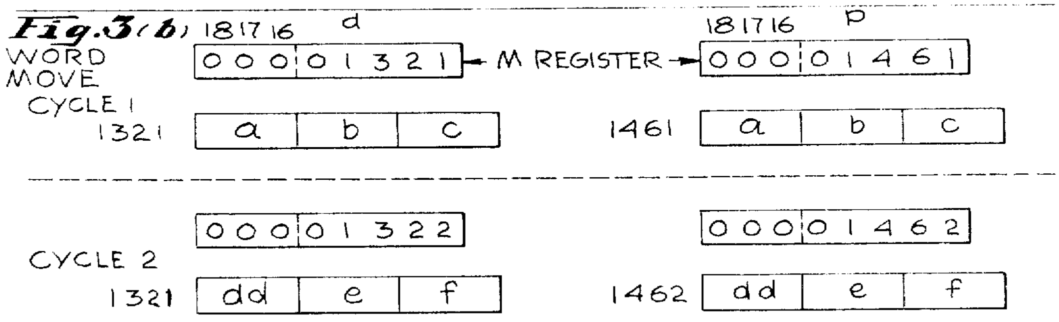
Figure 3C:
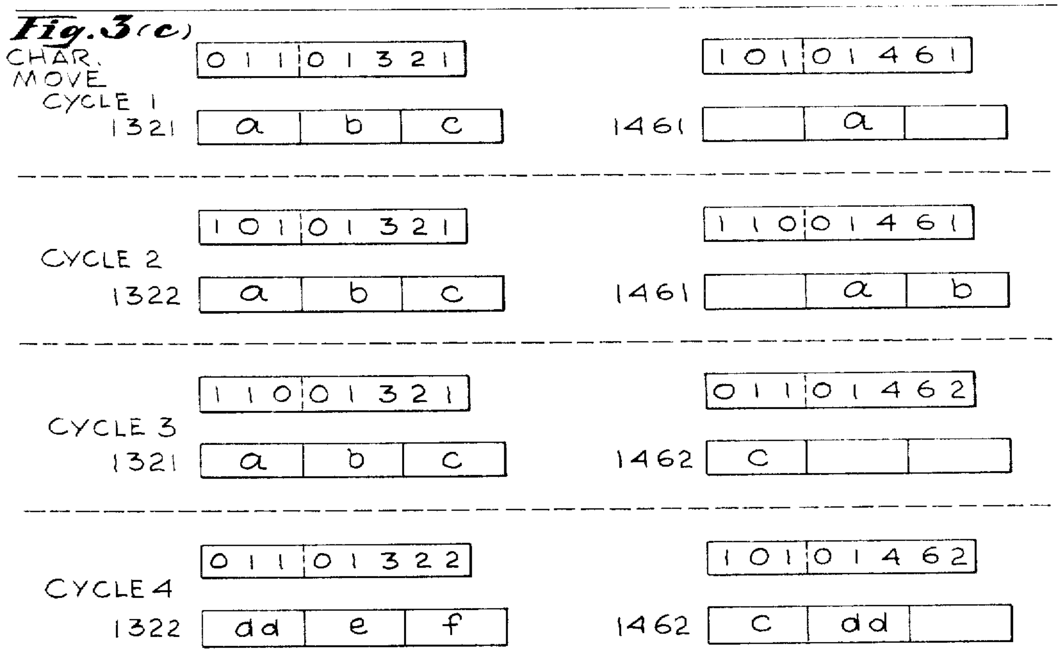

FIG. 3*b* illustrates the word move logand. In order to perform the word move logand, two blocks of word locations must be identified. Accordingly, the address *d* of the first word location in a first block of word locations is stored in the D register and the address *p* of the first word location in a second block of word locations is stored in the P register. Word location addresses are stored in bits 1 through 15 of the respective registers. A word location address is denoted by binary "0" in the bit positions 16, 17, and 18 of the addresses. If a character address is to be represented, as will become clearer hereinafter, only one of the bit positions 16, 17, and 18 of an address comprises a binary "0." The word location addresses in bit positions 1 through 15 are represented in FIG. 3 in an octal code for the sake of simplicity in illustration. FIGS. 3*b*–3*e* illustrate the addresses successively entered into the M register in the course of the performance of each type of logand and the information entered into the illustrative memory locations in response to those addresses and the type of logand being employed.

During cycle 1 of the word move logand, the contents of word location 1321, as defined by the word location address portion of the address stored in the D register, are entered into the E register in response to gating signal WL as recalled from the table of FIG. 2*c*. Subsequently, in response to gating signal RI, the contents of word location 1321 are entered into the A register. In response to gating signal RP, the contents of the A register are stored in the memory at word location 1461, defined by the word location address portion of the address *p*. Consequently, as suggested by the table of FIG. 2*c*, at the end of cycle 1 of the word move logand, the contents of the first word location in a first block of word locations has been transferred to the first word location in a second block of word locations. During cycle 2 of the word move logand, the word location address portion of address *d* has been incremented by one so as to cause the contents of word location 1322 to be transferred to the E register during state RI and subsequently into the A register in response to gating signal RI. Subsequently the contents of the A register are transferred into the E register in response to gating signal RP and hence into the word location $p+1$ of the memory. In this manner, it should be apparent that words in a first block of word locations can be successively transferred to word locations in a second block of word locations.

In the character move logand, character addresses *d* and *p* are initially stored in the D and P registers. As aforementioned, character addresses are denoted by causing a unique bit to be entered into one of the stages 16, 17, and 18 comprising the character location address portions of address *d* and *p*. Note that character address *d* initially contains a binary "0" in bit position 18 thereof while bit positions 16 and 17 contains a binary "1." On the other hand, note that bit position 17 of character address *p* initially contains a binary "0" while bit positions 16 and 18 contain binary "1's." During cycle 1 of the character move logand, the zero in bit position 18 of address *d* causes character *a* from word location 1321 to be transferred from the E register to the A register in response to gating signal RI. (It is pointed out that a binary "0" in bit position 18 will be used to identify character position 1, a binary "0" in bit position 17 to identify character position 2, and a binary "0" in bit position 16 to identify character position 3.) Character *a* transferred into the A register in response to gating signal RI will be transferred into the E register in response to gating signal RP and thence stored in the character location in memory identified by the character address *p*. Since the binary "0" in the character location address portion of the address *p* is in bit position 17 during character move logand cycle 1, character *a* will be transferred into character position 2 of word location 1461.

During cycle 2 of the character move logand, the contents of the character location address portion of address *d* and *p* shifts one position to the right such that the binary "0" in bit position 18 of the address *d* during cycle 1 shifts into bit position 17 to define address $d+1$ during cycle 2 while the "0" in bit position 17 of address *p* during cycle 1 similarly shifts into bit position 16 to define address $p+1$. Consequently, character *b* from word location 1321 is transferred into the A register in response to gating signal RI during cycle 2 of the character move logand and thence transferred into character position 3 of word location 1461 in response to gating signal RP.

During cycle 3 of the character move logand, the "0" in the character location address portion of the evolved *d* address shifts into position 16 so as to identify character *c* of word location 1321. The "0" in the character location address portion of the evolved *p* address shifts into bit position 18 and in so doing also causes the information in the word location address portion of the evolved *p* address to be incremented. Consequently, character *c* from word location 1321 is transferred to character position 1 of word location 1462 during cycle 3. During cycle 4, the "0" in bit position 16 of the evolved *d* address shifts to bit position 18 and consequently causes the word location address portion of the evolved *d* address to be incremented. Therefore, character *dd* of word location 1322 is transferred to character position 2 of word location 1462.

From the foregoing, it should be appreciated that a plurality of characters stored in a first block of character locations in memory can be transferred to arbitrary sequential character locations in a second block of character locations elsewhere in memory.

It has been seen that the word move logand enables words to be selectively moved while the character move logands permits characters to be selectively moved but in either case the order of the words or characters is maintained and the procedure merely calls for a transfer of information from one place in memory to another place in memory.

Figure 3D:
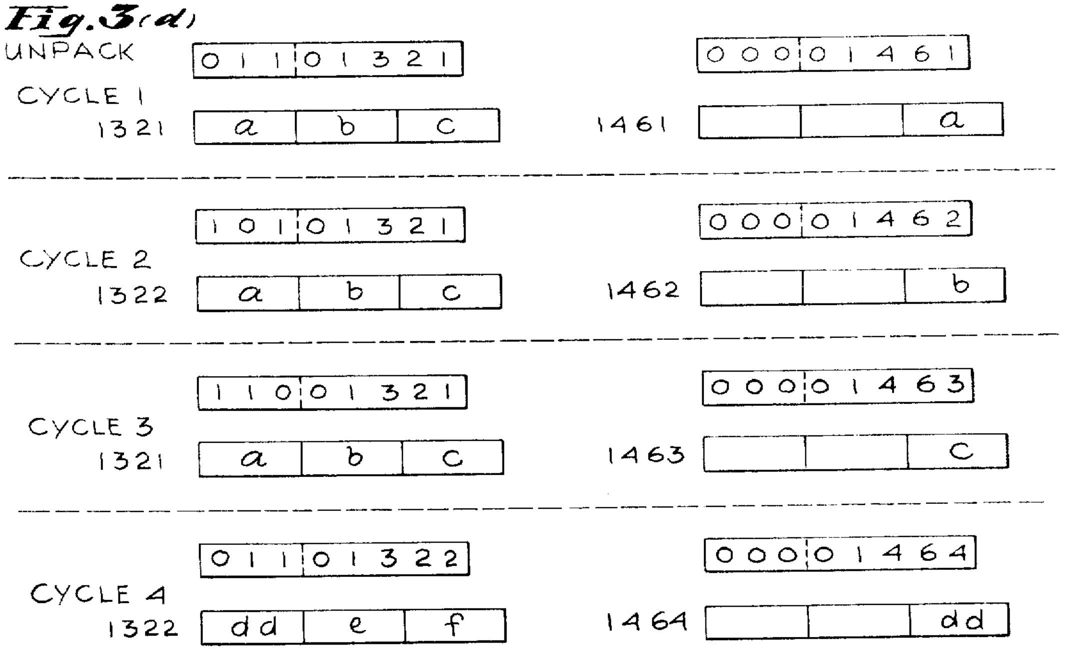

The unpack logand is illustrated in FIG. 3*d* and necessitates a character address *d* being initially defined in the D register and a word address *p* being initially defined in the P register. Note that during cycle 1 of the unpack logand, character *a* is selected from memory word location 1321 and loaded into memory word location 1461. Inasmuch as the address *p* is a word address and therefore its character location address portion denotes no particular character location, the character *a* is inserted in character position 3 (for reasons to become clearer in the discussion of FIG. 5) of word location 1461. During cycle 2, character *b* from word location 1321 is selected and loaded into character position 2 of word location 1462 of the memory. It should be apparent that the word location address portion of address *p* is incrmented by one between cycles 1 and 2 as was the case in the word move logand when address *p* constituted a word location address. During cycle 3, character *c* from word location 1321 is selected and loaded into character position 3 of word location 1463. During cycle 4, the word location address portion of address *d* is incremented by one so that character *dd* can be selected and loaded into character position 3 of word location 1464.

Figure 3E:
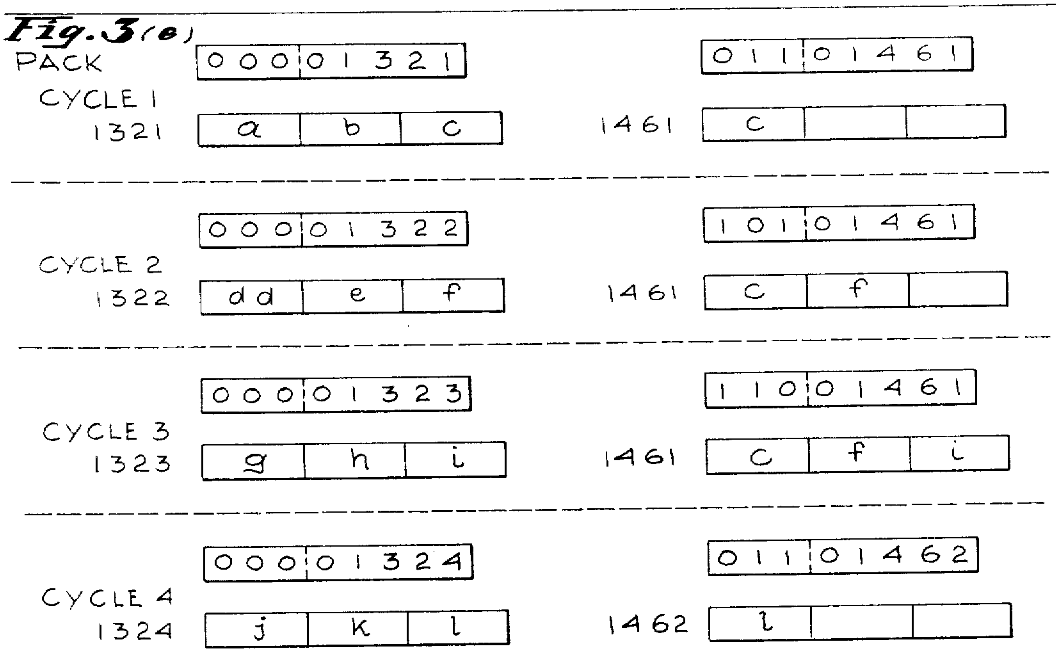

The pack logand whose operation is illustrated in FIG. 3*e* is the reverse of the unpack logand. Herein, a word location address *d* is initially defined in the D register while a character location address *p* is initially defined in the P register. During cycle 1, character position, 3, that is character *c* of the word location 1321 is selected and loaded into character position 1, as defined by the binary "0" in bit position 18 of address *p*, of word location 1461. Since the character location address portion of address *d* consists of all zeros, its word location address portion is incremented by one between cycles 1 and 2 so that character *f* is selected during cycle 2 and loaded into character position 2 of word location 1461. Similarly, during cycle 3, character *i* is selected from word location 1323 and loaded into character position 3 of word location 1461. Between cycles 3 and 4, the word location address portion of address *p* is incremented by one such that during cycle 4 character 1 from word location 1324 is loaded into character position 1 of word location 1462. From the foregoing, it should now be appreciated that the pack and unpack logands can be utilized so as to separate merged characters for individual processing and merge separated characters to permit parallel processing by e.g. arithmetic apparatus (not shown).

Figure 4:
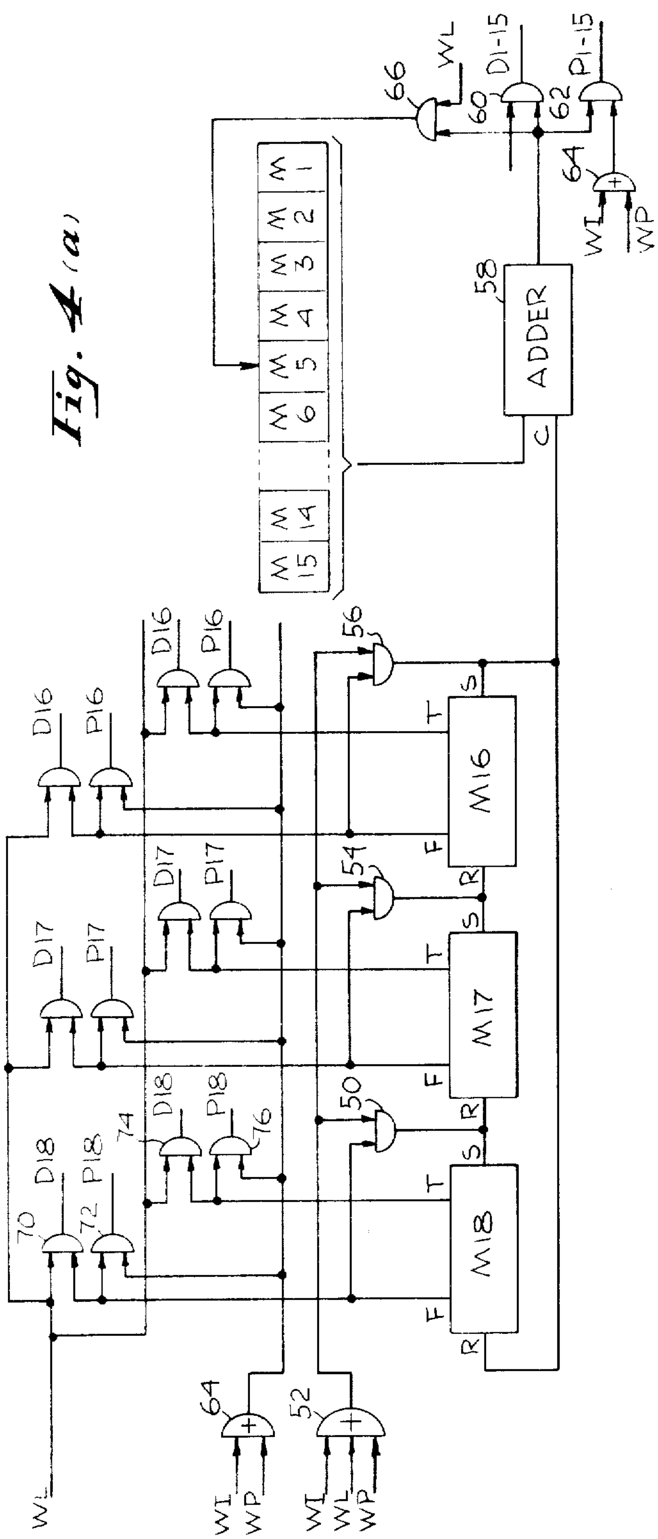
Figure 4:
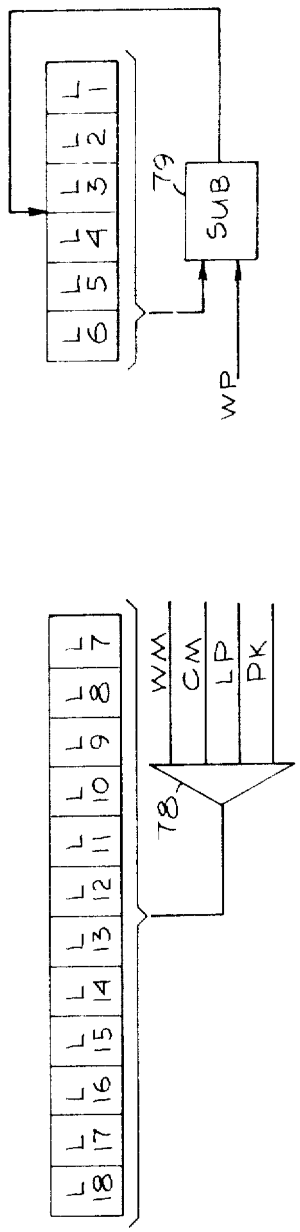

Up to this point, only information manipulation has been considered and little attention has been paid to hardware means for implementing such manipulations. Attention is now called to FIG. 4 which illustrates two significant hardware elements which contribute heavily to the aforedescribed manipulative operations. FIG. 4*a* schematically illustrates the M register and FIG. 4*b* schematically illustrates the L register.

It will be assumed that each of the stages of the M register comprises a conventional set-reset flip-flop. As previously pointed out, stages 1 through 15 store the word location address portion of an address word while stages 16 through 18 store the character location address portion. The stages 16 through 18 are arranged to define a ring counter. That is, the false output terminal of the flip-flop of stage 18 is connected to the input of an AND gate 50 together with the output of an OR gate 52. The inputs to OR gate 52 respectively comprise outputs of AND gates 36 (FIG. 2*a*) which respectively provide gating signals WL, WI, and WP. The output of AND gate 50 is connected to the set input terminal of the flip-flop of M register stage 18 and the reset input terminal of M register stage 17. The false output terminal of stage 17 is connected through AND gate 54 to the set input terminal of stage 17 and the reset input terminal of stage 16. Similarly, the false output terminal of stage 16 is connected through AND gate 56 to the set input terminal of stage 16 and the reset input terminal of stage 18. It will be recalled that a character address is represented by one binary "0" and two binary "1's" in bit positions 16–18. Consequently, upon the generation of each and every write gating signal, the binary "0" of the character location address portion is shifted one stage to the right.

The output of AND gate 56 is connected to the carry input terminal of an adder circuit 58 along with the output channel carrying the contents of stages 1 through 15 of the M register. The output of the adder circuit 58 is connected to the input of AND gate 60 along with the output of AND gate 36 providing the WL gating signal. The output of AND gate 60 is connected to the input channel of stages 1 through 15 of the D register. Additionally, the output of adder circuit 58 is connected through AND gate 62, along with the output of OR gate 64 whose inputs comprise the outputs of AND gates 36 providing the WI and WP gating signals. The output of AND gate 62 is connected to the input channel of stages 1 through 15 of the P register. The output of adder circuit 58 is also connected through AND gate 66 to the input channel of stages 1 through 15 of the M register so as to permit the contents of stages 1 through 15 of the M register to be incremented without transfer to another register. Inasmuch as the operation of the logands with which this discussion is concerned, however, does not require incrementing of the contents of the M register without transfer to another register, the control input terminal connected to the AND gate 66 is not herein identified.

It is pointed out that although only one line is illustrated as representative of each of the input and output channels of stages 1 through 15 of the various registers it should be understood that each channel is actually capable of transferring 15 bits in parallel.

The false output terminal of stage 18 of the M register is connected to the input of AND gates 70 and 72 whose output terminals are connected to the reset input terminals of stages 18 of the D and P registers respectively. Similarly, the true output terminal of stage 18 of the M register is connected to the input of AND gates 74 and 76 whose outputs are respectively connected to the set input terminals of stages 18 of the D and P registers. Similarly, the false and true output terminals of stages 16 and 17 of the M register are connected to reset and set input terminals of stages 16 and 17 of the D and P registers. The output of AND gate 36 providing gating signal WL is connected to the inputs of all gates whose outputs are connected to input terminals of the D register. The output of OR gate 64 whose input terminals are connected to the outputs of AND gates 36 providing gating signals WI and WP, is connected to the inputs of all gates whose outputs are connected to input terminals of the P register.

In the operation of the M register, the character location address stored in stages 16 through 18 thereof is shifted to the right in response to each write gating signal. Since the addresses *d* and *p* are each in the M register once during each cycle when a write gating signal occurs, the character location address will be shifted to the right one position each cycle as shown in FIG. 3. Whenever a binary "0" is in bit position 16 of the M register, a subsequent write gating signal will cause AND gate 56 to provide an output to the carry input terminal of adder circuit 58 so as to cause the word location address in stages 1 through 15 of the M register to be incremented by one prior to transfer to the D or P registers.

As previously pointed out, the logand is stored in the L register with the second section, i.e., *n*, being stored in bit positions 1 through 6 thereof and the logand type information being stored in bit positions 7 through 18 thereof. The output of bit positions 7 through 18 of the L register is applied to a decoding network 78 which is provided with WM, CM, UP, and PK output terminals for identifying the logand as being one of the aforementioned types. The output of AND gate 36 providing gating signal WP is connected to the input of a subtracting circuit 79 along with the output channel of stages 1 through 6 of the L register. The output of subtractor circuit 79 is connected to the input channel of stages 1 through 6 of the L register. In operation, stages 1 through 6 of the L register, storing *n*, are decremented once each cycle, as shown in the table of FIG. 2*c* in response to the generation of gating signal WP. Consequently, when $n=0$, or in other words when stages 1 through 6 of the L register all store a binary "0," the performance of the logand should be terminate, as described in the flow diagram of FIG. 2*b*.

Attention is now called to FIG. 5 which illustrates the details of the memory and various registers together with the means interconnecting them. As previously noted, the memory includes eighteen magnetic core planes, each plane adapted to store bits of corresponding significance. Stages 1 through 15 of the M register are connected through an address decoding network 80 to the memory for selecting a word location based on the information stored therein.

Sense lines from each of the memory planes are connected through AND gates 82 to stages of the E register of corresponding significance. Inputs to each of the AND gates 82 are also connected to the output of OR gate 84 whose inputs are respectively connected to the outputs of AND gates 36 providing the gating signals WL, WP, and WI. Similarly, drive lines to each of the memory planes are respectively connected to the outputs of AND gates 86 whose inputs are connected to the outputs of stages of the E register of corresponding significance and to the output of OR gate 88. The inputs to OR gate 88 are connected to the outputs of AND gates 36 providing gating signals RL, RI, and RP. It will be noted that information is read from the memory during read states, i.e. in response to write gating signals and conversely is written into the memory during write states, i.e. in response to read gating signals.

Both the E and A registers in FIG. 5 are illustrated as comprised of three portions, each portion adapted to store a different character. The portions E3 and A3 respectively include stages 1–6 of the E and A registers. The portions E2 and A2 respectively include stages 7-13 of the E and A registers and the portions E1 and A1 respectively include stages 13–18 of the E and A registers. Since all of the stages of each portion are similarly gated, for purposes of clarity, each portion is illustrated as having a single input terminal and a single output terminal.

From what has been said thus far, it should be apparent that four basically different types of transfers are performed between the E and A registers. That is, in the performance of the word move logand, in response to gating signal RI, the entire contents of the E register is transferred directly into corresponding stages of the A register. In response to gating signal RP, the entire contents of the A register is transferred directly into corresponding stages of the E register.

A direct transfer from the E to A register is also performed in the perfomance of the pack logand in response to gating signal RI. A direct transfer from the A to E register is also performed in the performance of the unpack logand in response to gating signal RP.

In order to control these direct transfers, AND gates 90 and 92 are provided. The inputs to AND gate 90 comprise the RP output terminal from gate 36 (FIG. 2*a*) and the output of OR gate 94 whose inputs comprise the word move (WM) output terminal and the unpack (UP) output terminal from decoding network 78 (FIG. 4*b*). The inputs to AND gate 92 comprise the RI output terminal from gate 36 and the output of OR gate 96 whose inputs comprise the word move (WM) output terminal and the pack (PK) output terminal from decoding network 78.

The A to E register transfer performed in the performance of the pack logand in response to gating signal RP and the E to A register transfer performed in the performance of the unpack logand in response to gating signal RI are not direct transfers but rather are what might be called split transfers. That is, the entire contents of either the A or E registers is not transferred to corresponding stages of the other register. Instead, it will be recalled that in the performance of the pack logand, the transfer is to a selected character position in the E register from character position 3 of the A register. In the performance of the unpack logand, the transfer is to character position 3 of the A register from a selected character position in the E register.

Performance of the character move (CM) logand requires two split transfers. That is, a first transfer from a selected character position in the E register to character position 3 of the A register and a second transfer from character position 3 of the A register to a selected character position in the E register.

In order to control these split transfers, AND gates 98 and 100 are provided. The inputs to AND gate 98 comprise the RP output terminal from gate 36 and the output of OR gate 102 whose inputs comprise the character move (CM) output terminal and the pack (PK) output terminal from decoding network 78. The inputs to AND gate 100 comprise the RI output terminal from gate 36 and the output of OR gate 104 whose inputs comprise the character move (CM) output terminal and the unpack (UP) output terminal from decoding network 78.

In order to accomplish E to A register transfers, direct transfer AND gates 106, 108, and 110 are provided. The outputs of gates 106 and 108 are connected directly to the inputs of portions A1 and A2. The output of gate 110 is connected to the input of OR gate 111 whose output is connected to the input of portion A3. Split transfer gates 112, 114, and 116 all of whose outputs are connected to the input of OR gate 111 are also provided. The output of portion E1 is connected to the inputs of gates 106 and 112. The output of portion E2 is connected to the inputs of gates 108 and 114. The output of portion E3 is connected to the inputs of gates 110 and 116. The output of direct transfer control gate 92 is connected to the inputs of gates 106, 108, and 110. The output of split transfer control gate 100 is connected to the inputs of gates 112, 114, and 116. Additionally, the false output terminals of stages 18, 17, and 16 of the M register are respectively connected to the inputs of gates 112, 114, and 116.

In order to accomplish A to E register transfers, direct transfer AND gates 118, 120, and 122 and split transfer AND gates 124, 126, and 128 are provided. The outputs of portions A1, A2, A3 are respectively connected to the inputs of gates 118, 120, and 122 together with the output of direct transfer control gate 90. The output of portion A3 is connected to the inputs of gates 124, 126, and 128 together with the output of split transfer control gate 98. In addition, the false outputs of stages 18, 17, and 16 of the M register are respectively connected to the inputs of gates 124, 126, and 128.

The outputs of gates 118 and 124 are connected to the input of OR gate 130 whose output is connected to the input of portion E1. Similarly, the outputs of gates 120 and 126 are connected to the input of OR gate 132 whose output is connected to the input of portion E2. Also, the outputs of gates 122 and 128 are connected to the input of OR gate 134 whose output is connected to input of portion E3.

In the performance of any one of the four logands and in response to any one of the read gating signals (i.e. RI, RP or RL), a word in the word location defined by the word location address in the first 15 stages of the M register is transferred through AND gates 82 into the E register. Upon the generation of a subsequent write gating signal, the information is rewritten back into the same memory word location unless new information is entered into the E register prior to the generation of the write gating signal.

In response to the generation of the RI gating signal, information is transferred from the E to the A register as determined by the type of logand being processed and the information stored in stages 16 through 18 of the M register. That is, if all zeros are stored in stages 16 through 18 of the M register, as before noted, the M register defines a word location address as distinguished from a character location address. Consequently, the information in each of the stages of the E register is directly transferred through AND gates 106, 108, 110 to a corresponding stage of the A register. If on the other hand, the information in stages 16 through 18 of the M register indicates that the M register defines a character location address, only the character from the E register associated with the bit position storing a binary "0" in the M register will be transferred to character 3 of the A register. For example, if a binary "0" is stored in bit position 18 of the M register, only gate 112 associated with stages 13–18 of the E register will be enabled in response to the generation of the RI gating signal to cause character 1 to be transferred from the E to the A register. On the other hand, if the binary "0" were in stage 16 of the M register, character 3 would be transferred through AND gate 116 to the A register.

In response to the generation of the RP gating signal, information is transferred from the A to the E register as determined by the type of logand being processed and the information stored in stages 16 through 18 of the M register. That is, if all "0's" are stored in stages 16 through 18 of the M register, as before noted, the M register defines a word location address as distinguished from a character location address. Consequently, the information in each of the stages of the A register is directly transferred through AND gates 118, 120, and 122 to a corresponding stage of the E register. If on the other hand, the information in stages 16 through 18 of the M register indicates that the M register defines a character location address, the character stored in character position 3 of the A register will be transferred to the character position in the E register associated with the bit position storing a binary "0" in the M register. For example, if a binary "0" is stored in bit position 18 of the M register, only gate 124 associated with stages 13 through 18 of the E register will be enabled in response to the generation of the RP gating signal to cause a character to be transferred into character position 1 (i.e. portion E1) of the E register. On the other hand, if the binary "0" were in stage 16 of the M register, the contents of portion A3 would be transferred through AND gate 128 to portion E3.

In addition to the transfers between memory and the E register and the E and A registers under the control of the M register, it is necessary to provide means for controlling the transfers between the M register and the P and D registers. Note from the table of FIG. 2*c* that the contents of the D register are transferred into the M register in response to the generation of gating signal WL and that the contents of the P register are transferred into the M register in response to the generation of gating signal WI. In order to perform these transfers, the output of each of the stages of the P and D registers is connected to the input of an AND gate whose output is connected to the input of an OR gate associated with the corresponding stage of the M register. That is, the outputs of stages 16–18 and 1–15 of the D register are respectively connected to the inputs of AND gates 140 and 141 while the output of stages 16–18 and 1–15 of the P register are connected to the inputs of AND gate 142 and 143. The outputs of AND gates 140 and 142 are connected to the input of OR gate 144 whose output is connected to the input of stages 16–18 of the M register. The outputs of AND gates 141 and 143 are connected to the input of OR gate 145 whose output is connected to the input of stages 1–15 of the M register. Additionally, the output of AND gate 36 providing gating signal WL is connected to the input of gates 140 and 141. Similarly, the output of AND gate 36 generating gating signal WI is connected to the input of gates 142 and 143. With this implementation, the contents of the D register is transferred into the M register in response to the generation of gating signal WL and the contents of the P register is transferred into the M register in response to the generation of gating signal WI. The contents of the M register is transferred to the P and D registers by the gating means illustrated in FIG. 4*a*.

From the foregoing, it should be appreciated that a data processing apparatus has been disclosed herein which is responsive to logical commands for transferring words between memory and registers, such words being character formatted so as to contain a plurality of characters, and for selectively transferring words or individual characters between registers. As a consequence of incorporating this capability into data processing apparatus, characters can be manipulated so that they can be operated upon in parallel, that is in a word oriented manner wherever possible. The processing of characters in parallel of course enables processing time to be considerably reduced over what would be required if conventional serial character processing were employed. If of course, considerable time and effort were expended in manipulating the characters to arrange them in a suitable format for parallel processing, little advantage would be gained in the overall processing task from the parallel processing. However, by virtue of the particular techniques introduced herein, principally the implementation and operation of the M, E and A registers, characters can be moved, packed, and unpacked with surprising ease to thereby permit the parallel processing of characters to be extremely valuable.

The embodiments of the invention in which an exclusive property or privilege is claimed are defined as follows:

1. A digital data processing apparatus including:
a memory comprised of a plurality of digital storage elements arranged to define a plurality of word locations, each word location including a plurality of character locations;
a source of timing pulses;
a memory address register including a word location address portion for storing information identifying one of said word locations and a character location address portion for storing information identifying a character location in said identified word location;
means for incrementing said information stored in said character location address portion in response to said timing pulses;
means for incrementing said information stored in said word location address portion in response to said information stored in said character location address portion;
a storage register;
means for storing information in said storage register; and
means responsive to said information stored in said memory address register for selectively causing either the information stored in said identified character location to be entered into said storage register or the information stored in said storage register to be entered into said identified character location.

2. A digital data processing apparatus including:
a memory comprised of a plurality of digital storage elements arranged to define a plurality of word locations, each word location including a plurality of character locations;
a source of timing pulses;
a memory address register including a word location address portion for storing information identifying one of said word locations and a character location address portion for storing information identifying a character location in said identified word location, said character location address portion comprising a cyclic counter;
means for incrementing said information stored in said character location address portion in response to said timing pulses;
means for incrementing said information stored in said word location address portion in response to each cycle of said character location address portion counter;
a storage register;
means for storing information in said storage register; and
means responsive to said information stored in said memory address register for selectively causing either the information stored in said identified character location to be entered into said storage register or the information stored in said storage register to be entered into said identified character location.

3. A digital data processing apparatus including:
a memory comprised of a plurality of digital storage elements arranged to define a plurality of word locations, each word location including a plurality of character locations;
a source of timing pulses;
a memory address register including a word location address portion for storing information identifying one of said word locations and a character location address portion for storing information identifying a character location in said identified word location, said character location address portion comprising a ring counter including a plurality of stages equal in number to the number of character locations in each word location;

means for storing a unique digit in one of said ring counter stages;

means for shifting said unique digit in response to said timing pulses; and means for incrementing said information stored in said word location address portion each time said unique digit is shifted into a predetermined one of said stages.

4. A digital data processing apparatus including:

a memory comprised of a plurality of digital storage elements arranged to define a plurality of word locations, each word location including a plurality of character locations;

a source of timing pulses;

a memory address register including a word location address portion for storing information identifying one of said word locations and a character location address portion for storing information identifying a character location in said identified word location, said character location address portion comprising a ring counter including a plurality of stages equal in number to the number of character locations in each word location;

means for storing a unique digit in one of said ring counter stages;

means for shifting said unique digit in response to said timing pulses;

means for incrementing said information stored in said word location address portion each time said unique digit is shifted into a predetermined one of said stages;

a storage register;

means for storing information in said storage register; and means responsive to said information stored in said memory address register for selectively causing either the information stored in said identified character location to be entered into said storage register or the information stored in said storage register to be entered into said identified character location.

5. A digital data processing apparatus including:

a memory comprised of a plurality of digital storage elements arranged to define a plurality of word locations, each word location including a plurality of character locations;

a source of timing pulses;

a memory address register including a word location address portion for storing information identifying one of said word locations and a character location address portion for storing information identifying a character location in said identified word location, said character location address portion comprising a ring counter including a plurality of stages equal in number to the number of character locations in each word location;

means for storing a unique digit in one of said ring counter stages;

means for shifting said unique digit in response to said timing pulses;

means for incrementing said information stored in said word location address portion each time said unique digit is shifted into a predetermined one of said stages;

an exchange register;

a storage register;

means for storing information in said storage register; and means responsive to said information stored in said word and character location address portions for selectively causing either the word stored in said identified word location to be entered into said exchange register and the character stored in said identified character location portion to be transferred from said exchange register to said storage register or the information stored in said storage register to be entered into said exchange register and a character stored therein to be transferred to said character location identified by the information stored in said word and character location portions.

6. In a digital data processing apparatus including a memory comprised of a plurality of digital storage elements arranged to define a plurality of word locations, means for successively transferring words stored in successive word locations in a first block of word locations into successive word locations in a second block of word locations, said means comprising:

a source of timing pulses;

a memory address register;

an auxiliary address register;

means for storing word location address information in said memory address register and said auxiliary address register respectively identifying first word locations in said first and second blocks;

means responsive to successively occurring timing pulses for exchanging stored information between said auxiliary address register and said memory address register;

means for incrementing information transferred between said memory address register and said auxiliary address register;

a storage register; and means responsive to successively occurring timing pulses for alternately transferring words from word locations identified by information stored in said memory address register into said storage register and words stored in said storage register into word locations identified by information stored in said memory address register.

7. In a digital processing apparatus including a memory comprised of a plurality of digital storage elements arranged to define a plurality of word locations, means for successively transferring words stored in successive word locations in a first block of word locations into successive word locations in a second block of word locations, said means comprising:

a source of timing pulses;

a memory address register;

an auxiliary address register;

means for storing word location address information in said memory address register and said auxiliary address register respectively identifying first word locations in said first and second blocks;

means responsive to successively occurring timing pulses for exchanging stored information between said auxiliary address register and said memory address register;

means for incrementing information transferred between said memory address register and said auxiliary address register;

a storage register;

means responsive to successively occurring timing pulses for alternately transferring words from word locations identified by information stored in said memory address register into said storage register and words stored in said storage register into word locations identified by information stored in said memory address register;

a counter;

means for storing information in said counter indicating the number of words to be transferred; and means for causing said counter to count in response to each word transferred between a word location and said storage register.

8. In a digital data processing apparatus including a memory comprised of a plurality of digital storage elements arranged to define a plurality of word locations, each word location including a plurality of character locations, means for successively transferring characters stored in successive character locations in a first block of character locations into successive character locations in a second block of character locations, said means comprising:

a source of timing pulses;

a memory address register;

an auxiliary address register;

means for storing character location address information in said memory address register and said auxiliary address register respectively identifying first character locations in said first and second blocks;

means responsive to successively occurring timing pulses for exchanging stored information between said auxiliary address register and said memory address register;

means for incrementing information transferred between said memory address register and said auxiliary address register;

a storage register; and means responsive to successively occurring timing pulses for alternately transferring characters from character locations identified by information stored in said memory address register into said storage register and characters stored in said storage register into character locations identified by information stored in said memory address register.

9. In a digital data processing apparatus including a memory comprised of a plurality of digital storage elements arranged to define a plurality of word locations, each word location including a plurality of character locations, means for successively transferring characters stored in successive character locations in a first block of character locations into successive character locations in a second block of character locations, said means comprising:

a source of timing pulses;

a memory address register;

an auxiliary address register;

means for storing character location address information in said memory address register and said auxiliary address register respectively identifying first character locations in said first and second blocks;

means responsive to successively occurring timing pulses for exchanging stored information between said auxiliary address register and said memory address register;

means for incrementing information transferred between said memory address register and said auxiliary address register;

a storage register;

means responsive to successively occurring timing pulses for alternately transferring characters from character locations identified by information stored in said memory address register into said storage register and characters stored in said storage register into character locations identified by information stored in said memory address register;

a counter;

means for storing information in said counter indicating the number of characters to be transferred; and means for causing said counter to count in response to each character transferred between a character location and said storage register.

10. The apparatus of claim 8 wherein said memory address register includes a word location address portion and a character location address portion;

said character location address portion comprising a cyclic counter;

said means for incrementing information transferred between said memory address register and said auxiliary address register including means for incrementing said counter in response to each transfer between said memory address register and said auxiliary address register and for incrementing said word location address portion in response to specific cycles of said counter.

11. The apparatus of claim 10 wherein said means for transferring characters from character locations to said storage register includes means responsive to the state of said character location address portion counter.

12. In a digital data processing apparatus including a memory comprised of a plurality of digital storage elements arranged to define a plurality of word locations, each word location including a plurality of character locations positioned in a fixed order, means for successively transferring characters stored in a block of successive character locations into the same character positions in a block of successive word locations, said means comprising:

a source of timing pulses;

a memory address register;

an auxiliary address register;

means for storing character location address information in said memory address register identifying the first character location in said block of successive character locations;

means for storing word location address information in said auxiliary address register identifying the first word location in said block of successive word locations;

means responsive to successively occurring timing pulses for exchanging stored information between said auxiliary address register and said memory address register;

means for incrementing information transferred between said memory address register and said auxiliary address register;

a storage register; and means responsive to successively occurring timing pulses for alternately transferring characters from character locations identified by information stored in said memory address register into said storage register and characters stored in said storage register into said same character positions of word locations identified by information stored in said memory address register.

13. In a digital data processing apparatus including a memory comprised of a plurality of digital storage elements arranged to define a plurality of word locations, each word location including a plurality of character locations positioned in a fixed order, means for successively transferring characters from the same character positions in a block of successive word locations into successive character locations in a block of character locations, said means comprising:

a source of timing pulses;

a memory address register;

an auxiliary address register;

means for storing word location address information in said memory address register respectively identifying the first word location in said block of word locations;

means for storing character location address information in said auxiliary address register respectively identifying the first character location in said block of character locations;

means responsive to successively occurring timing pulses for exchanging stored information between said auxiliary address register and said memory address register;

means for incrementing information transferred between said memory address register and said auxiliary address register;

a storage register; and means responsive to successively occurring timing pulses for alternately transferring characters from the same character position of successive locations in said block of word locations identified by information stored in said memory address register into said storage register, and characters stored in said storage register into character locations identified by information stored in said memory address register.

References Cited by the Examiner

UNITED STATES PATENTS 3,161,763 12/1964 Glaser ---------- 235—157

ROBERT C. BAILEY, *Primary Examiner.*

R. B. ZACHE, *Assistant Examiner.*